Nov. 15, 1927.
W. D. BARNET
1,649,774
RUBBER WORKING AND ANALOGOUS MACHINERY
Filed Dec. 4, 1925 4 Sheets-Sheet 1
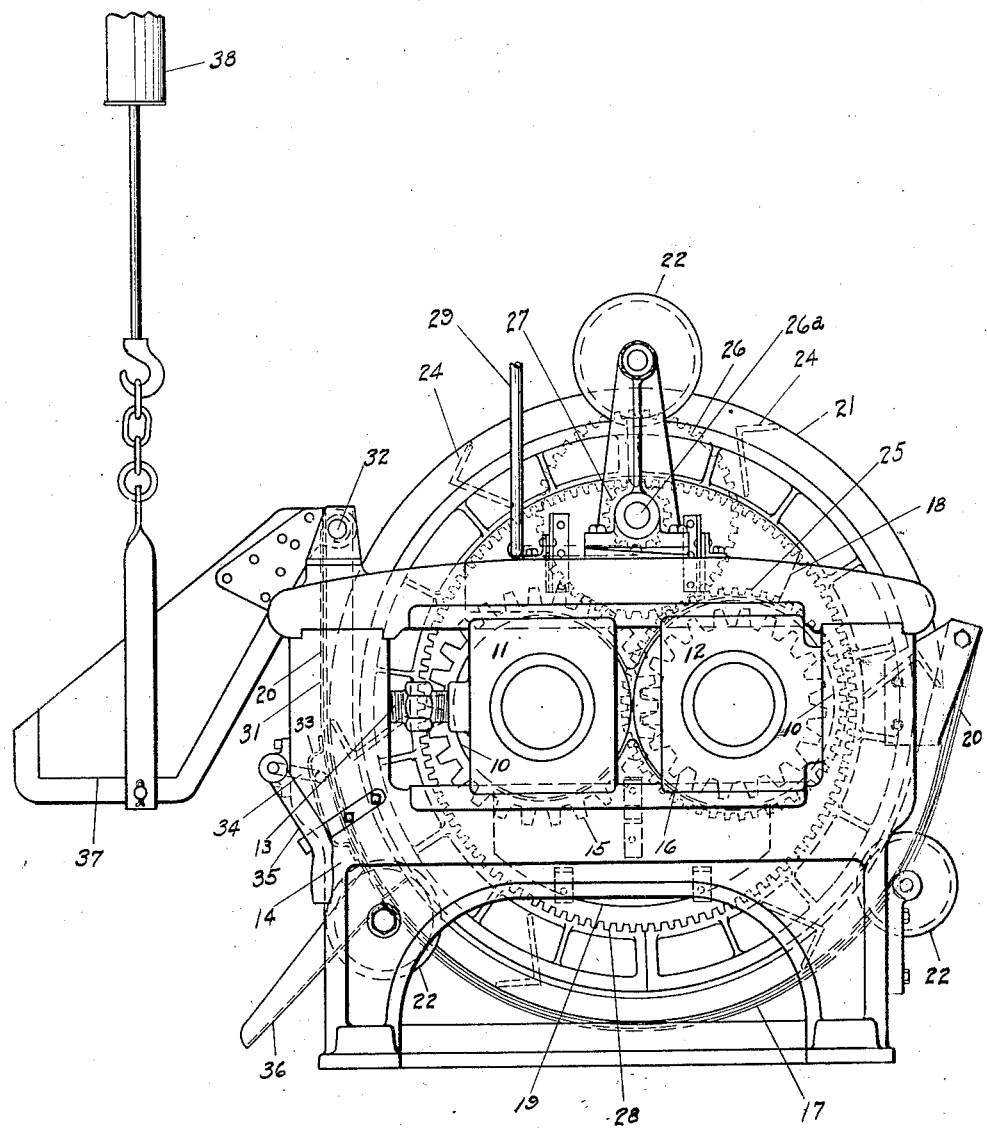
FIG. 1.
INVENTOR.
WILLIAM D. BARNET.
BY 
ATTORNEY.

Patented Nov. 15, 1927.

1,649,774

UNITED STATES PATENT OFFICE.

WILLIAM D. BARNET, OF AKRON, OHIO, ASSIGNOR TO THE XYLOS RUBBER COMPANY, OF AKRON, OHIO, A CORPORATION OF OHIO.

RUBBER-WORKING AND ANALOGOUS MACHINERY.

Application filed December 4, 1925. Serial No. 73,142.

This invention relates to rubber working and analogous machinery such as mills, washers, crackers or the like.

Heretofore, in mills, washers and crackers used in the rubber industry, which consist of cooperating horizontal rolls, considerable manual labor has been required for distributing the materials, such as rubber and compounding ingredients, reclaimed scrap or various low grade crude rubbers, to the rubber working rollers employed in machinery of this type. For example, the material has usually been thrown between the rolls by the operative, using a shovel or the like and distributing the material in this fashion, as well as he can, to be operated on by the rollers. Accordingly, the rollers are for a large part of the time idling, or at least not working on a maximum of material. Thus much time is lost in bringing the rubber to the desired constituency.

A number of different devices have been provided with the view of overcoming the foregoing disadvantages, such as the use of a flexible conveyor cooperating with the rollers to carry material dropping from between the same back into the upper bight thereof. These and other devices have not, however, been entirely satisfactory in use, this being especially so where materials, such as reclaimed rubber containing much acid or alkali, are being treated.

The chief object of the present invention is to provide in machinery of the class described a pan for receiving the materials from between the rollers and a "bucket" conveyor for lifting the material in the pan up into the upper bight of the rollers and evenly distributing the material thereon in quantities insuring a maximum capacity of the machine.

Another object of the invention is to provide a hopper for such machines adapted to dump the material to be treated into the upper bight of the rolls.

Another object of the invention is to provide in such a pan as described above, a closure plate adapted to be opened so that the bucket conveyor may discharge the material from the machine after the desired treatment.

Another object is to provide in machinery of this type a rotary bucket conveyor and means for supporting the same for rotating about the rolls, and preferably also means driven by the machine for rotating the conveyor.

The foregoing and other objects are obtained by the construction illustrated in the accompanying drawings. It is to be understood that the invention is not limited to the specific form thereof shown and described.

Of the accompanying drawings:

Figure 1 is a side elevation of a machine embodying the invention;

Figure 2:
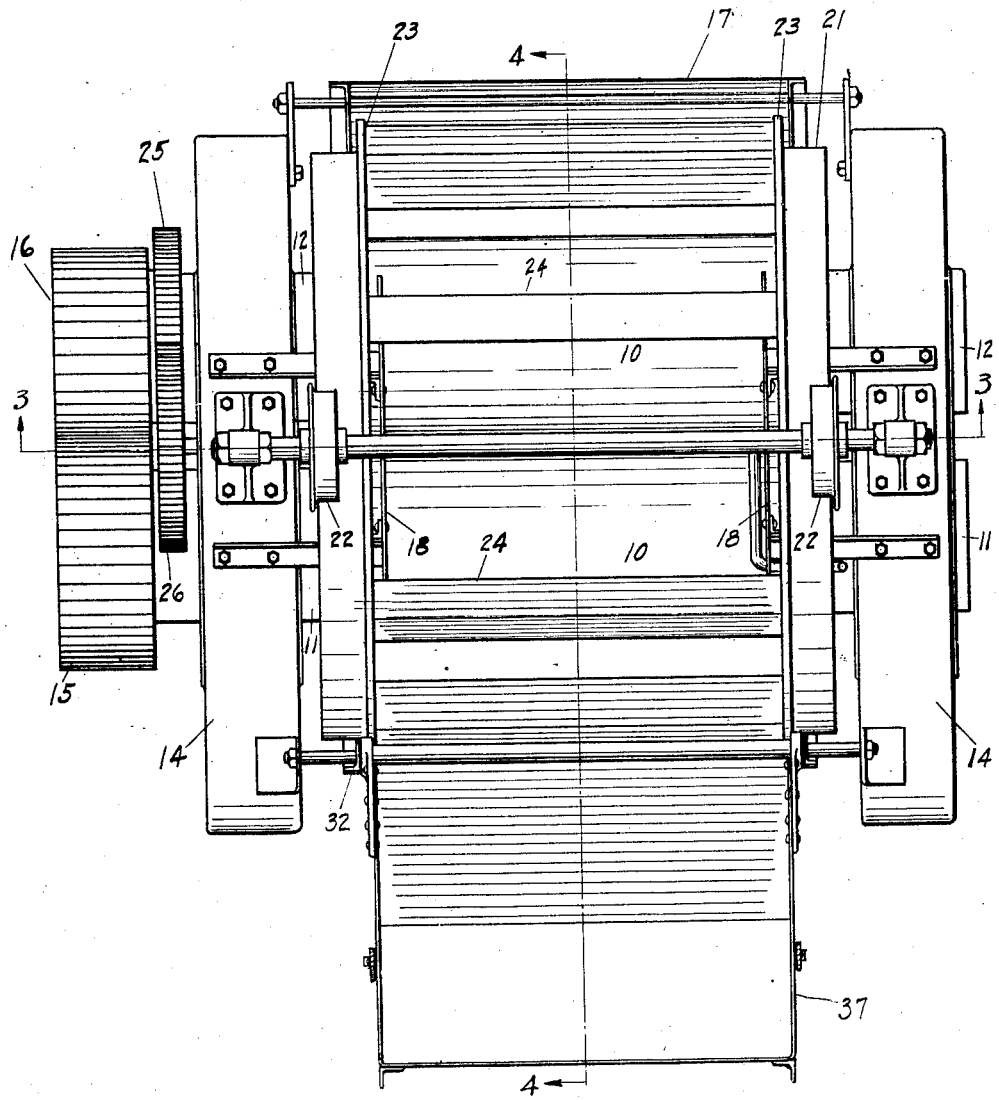
Figure 2 is a plan thereof.
Figure 3:
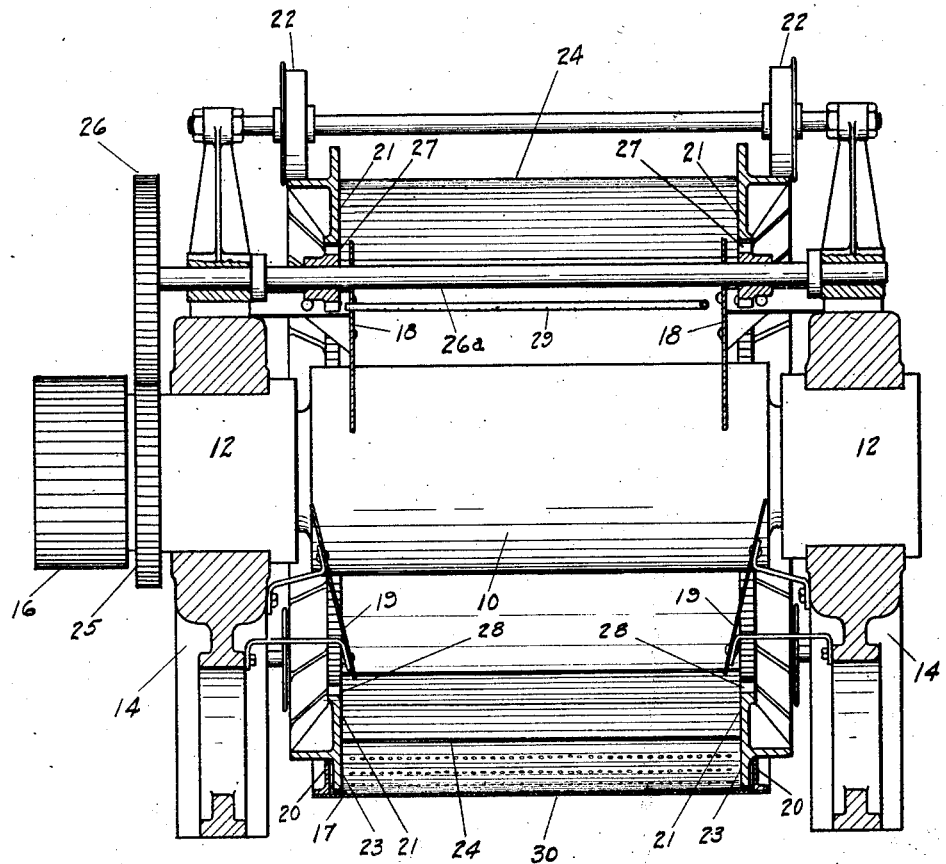
Figure 3 is a section on line 3—3 of Figure 2.

Referring to the drawings, 10, 10 are cooperating rollers such as used in mills, crackers, washers, etc. and one or both may be either smooth or roughened, depending upon the operations being performed. In the drawings, the invention is shown applied to washers for reclaimed rubber, hence one of said rolls will be roughened or corrugated. Rolls 10 may be journaled in blocks 11, 11 and 12, 12, the former being adjustable by suitable means such as 13 from or toward the latter, to vary the distance between the rolls 10, blocks 11 and 12 being suitably supported in spaced frame castings, such as 14, 14, of a known type.

Rollers 10 are driven by gears 15 and 16 secured thereon and meshed with each other, one of said gears being driven from any suitable source of power (not shown). Gears 15 and 16 may be of such size as to produce the same or different peripheral speeds of rollers 10 depending on the material being worked or the purpose for which it is being worked.

Arranged beneath rollers 10 is a pan 17 preferably extending upwardly in front of and to the rear of said rollers, pan 17 being of cylindrical shape beneath the axes of rolls 10, and adapted to receive material falling therefrom or passing therebetween. End plates 18, 18, shaped to fit into the upper bight of rollers 10, are provided to prevent the materials working out past the ends of rolls 10 and end plates 19, 19, shaped so as to extend into the under bight of rolls 10 and inclined from said ends slightly inwardly, are arranged to direct the materials into pan 17. Plates 18 and 19 are supported from frames 14 in any suitable way.

Figure 4:
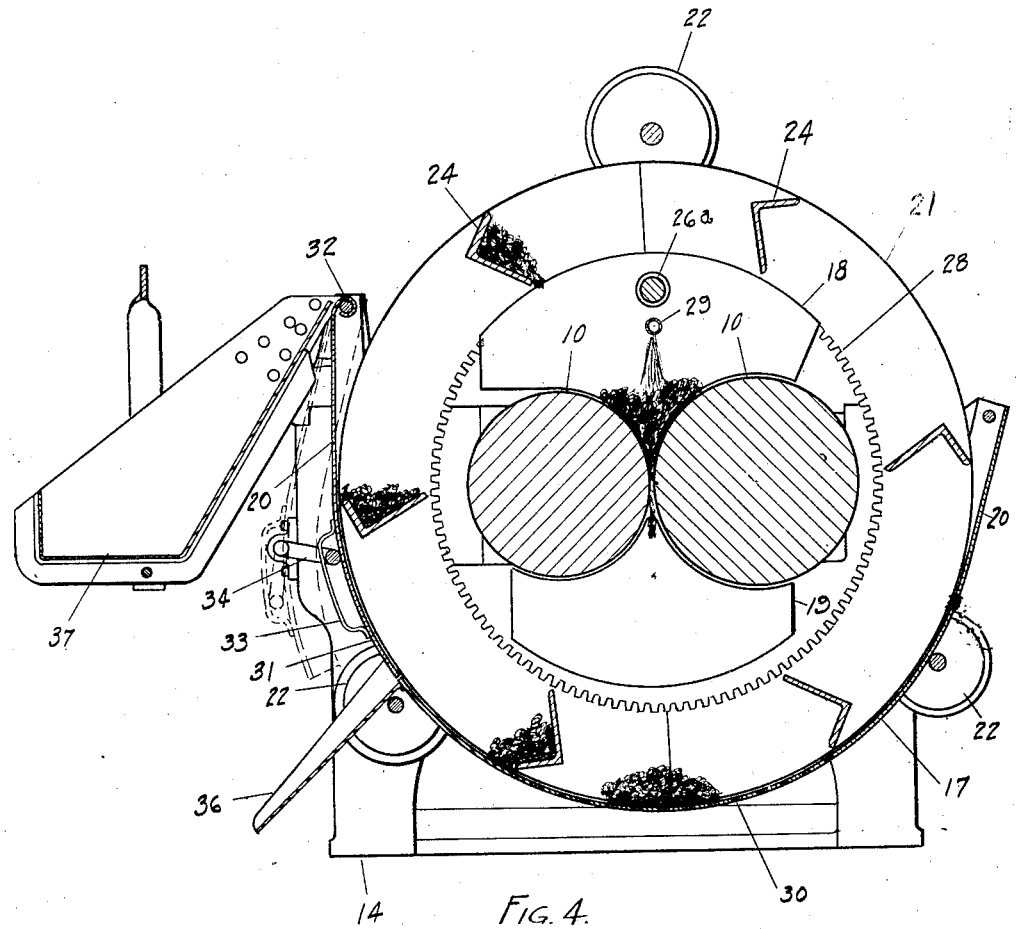
Figure 4 is a section on line 4—4 of Figure 2.

Pan 17 is provided with upwardly extending walls 20, 20 at its ends and arranged to rotate through pan 17, and about rollers 10 is a bucket conveyor 21 comprising spaced annular frame members bearing on supporting rollers 22, 22 journaled on frames 14 and having flanges 23, 23 projecting between walls 20, 20 of pan 17 so as, in effect, to form continuations of said walls. Extending between frame members 21 are buckets 24, 24 connecting said frame members together to form a rotary conveyor unit, buckets 24 being formed of angle iron of the shape best shown in Figure 4 and arranged to scrape the bottom of pan 17 to lift any material therein out of said pan, to elevate the material up over rollers 10 and to deposit it evenly into the upper bight thereof.

Conveyor 21 may be rotated in any suitable manner as by a gear 25 secured to roller 12, a gear 26 meshed therewith and secured on a shaft 26ª journaled on frames 14, pinions 27, 27 secured on shaft 26ª and meshed with internal gears 28, 28 on conveyor frame members 21.

When the machine described is used as a washer, a spray pipe 29 is provided for directing water into the upper bight and the bottom of pan 17 is formed with a screen at 30 through which the water may filter.

On the front of the machine, pan 17 is provided with a closure 31 pivoted at 32 on the upper edge of pan 17 and arranged to swing forwardly, straps such as 33 being secured thereon under which engage cranks 34 operable by a lever 35 to open said closure, whereby conveyor 21 will force the material from pan 17 out of said pan down on a conveyor 36 to discharge it from the machine.

Since rotary conveyor 21 is an open framework, material is easily supplied to the machine into the upper bight of the rolls. Preferably for this purpose there is pivoted at 32 a hopper 37 extending across the front of the machine and arranged normally in the position shown in Figure 1 to hold a supply of material in readiness for dumping into the machine. An air hoist 38 is connected to said hopper and arranged to swing the same upwardly about pivot 32 to dump the material into the machine.

The operation of the machine when used for washing reclaimed rubber may be described as follows:

Rolls 10 are continuously rotated and conveyor 21 will be continuously driven through pan 17 about said rollers. Hopper 37 is filled with material between each material treating operation and at the completion of the discharging operation is operated to dump the material into the machine.

The material works through rollers 10, being all the while sprayed by water from pipe 29 which dissolves out the cellulose materials and escapes through strainer 30 in the bottom of pan 17. The rubber falls into the bottom of pan 17 and is carried upwardly by buckets 24 and again dumped into the upper bight of rollers 10, the material being distributed evenly along the rollers as will be understood.

This operation can be carried on until the cellulose materials, dirt, etc. have been substantially entirely removed, or it may even be conducted to the point at which the working of the rubber will cause it to "sheet up" as will be understood by skilled artisans.

When the material has been worked to the condition desired, closure 31 is opened and conveyor 21 automatically discharges the material from the machine onto conveyor 36.

It will be apparent that a very effective material-working unit has been provided which dispenses with considerable labor and produces a more thoroughly and uniformly treated stock. It will also be apparent that modifications may be resorted to without departing from the spirit of the invention or the scope of the appended claims.

What is claimed is:

1. In machinery of the class described, the combination with a pair of horizontal cooperating rollers and means for driving said rollers, of a cylindrical pan beneath said rollers, a rotary conveyor comprising an open, annular frame carrying buckets operable through said pan and about said rollers to lift material out of the pan and distribute it into the upper bight of the rollers, means for supporting said conveyor comprising circumferential series of rollers, means for driving said frame comprising a pinion driven by said roller-driving means and an internal gear on said frame with which said pinion is meshed, a tiltable hopper adapted to dump material into the upper bight of the rollers, and a closure in said pan adapted to be opened so that the conveyor will discharge material therefrom.

2. In machinery of the class described, the combination with a pair of horizontal cooperating rollers, of a cylindrical pan beneath said rollers, a rotary conveyor comprising an open, annular frame carrying buckets operable through said pan and about said rollers to lift material out of the pan and distribute it into the upper bight of the rollers, a tiltable hopper adapted to dump material into the upper bight of the rollers, and a closure in said pan adapted to be opened so that the conveyor will discharge material therefrom.

3. In machinery of the class described, the combination with a pair of horizontal cooperating rollers, of a cylindrical pan beneath said rollers, a rotary conveyor comprising an open, annular frame carrying buckets operable through said pan and about said rollers to lift material out of the pan and distribute it into the upper bight of the rollers, and a closure in said pan adapted to be opened so that the conveyor will discharge material therefrom.

4. In machinery of the class described, the combination with a pair of horizontal co-operating rollers, of a cylindrical pan beneath said rollers, a rotary conveyor comprising an open, annular frame carrying buckets operable through said pan and about said rollers to lift material out of the pan and distribute it into the upper bight of the rollers, and a tiltable hopper adapted to dump material into the upper bight of the rollers.

5. In machinery of the class described, the combination with a pair of horizontal cooperating rollers, of a fixed cylindrical pan beneath said rollers, a rotary conveyor comprising an open, annular frame carrying buckets operable through said pan and about said rollers to lift material out of the pan and distribute it into the upper bight of the rollers, and a spray pipe for directing water into the upper bight of said rollers, said pan having a screen in the bottom thereof through which the water may drain.

WILLIAM D. BARNET.